United States Patent [19]

Adolfsson

[11] Patent Number: 4,909,643

[45] Date of Patent: Mar. 20, 1990

[54] DEVICE FOR ATTACHMENT OF A MACHINE MEMBER TO A SHAFT

[75] Inventor: Rune Adolfsson, Borås, Sweden

[73] Assignee: SKF Nova AB, Goteborg, Sweden

[21] Appl. No.: 286,478

[22] Filed: Dec. 19, 1988

[30] Foreign Application Priority Data

Jan. 11, 1988 [SE] Sweden ............................... 8800043

[51] Int. Cl.⁴ .............................................. F16C 19/06
[52] U.S. Cl. ..................................... 384/538; 384/540; 384/585
[58] Field of Search ............... 384/537, 540, 538, 585, 384/584, 428

[56] References Cited

U.S. PATENT DOCUMENTS

| | | |
|---|---|---|
| 929,851 | 8/1909 | Hess ................................ 384/540 X |
| 3,806,215 | 4/1974 | Price et al. ...................... 384/538 X |
| 3,807,820 | 4/1974 | Schuhmann ...................... 384/538 |
| 3,957,385 | 5/1976 | Ullberg ............................ 384/540 X |
| 4,343,565 | 8/1982 | Hallerback ....................... 384/538 |
| 4,545,691 | 10/1985 | Kastan et al. .................... 384/538 X |
| 4,552,468 | 11/1985 | Hopper, Jr. ...................... 384/540 X |

*Primary Examiner*—Lenard A. Footland
*Attorney, Agent, or Firm*—Eugene E. Renz

[57] ABSTRACT

A device for attachment of a machine member to a shaft, whereby the machine member has an opening for said shaft. The opening has on one hand surface portions of a shape corresponding to the shape of the shaft, cylindrical or tapering, and on the other hand, surface portions having a shape corresponding to the shape of the clamping surfaces of a clamping sleeve, for allowing optional attachment of the machine member directly on the shaft or by means of the clamping sleeve.

2 Claims, 2 Drawing Sheets

DEVICE FOR ATTACHMENT OF A MACHINE MEMBER TO A SHAFT

FIELD OF THE INVENTION

The present invention refers to a device for attachment of a machine member to a shaft, whereby the machine member has an opening for said shaft.

BACKGROUND OF THE INVENTION

When mounting a machine member, e.g. a bearing on a shaft, it is possible either to mount the machine member directly on the shaft by means of a press fit, a shrinkage fit or a glue joint, or by means of a clamping sleeve having tapering grooves or threads, whereby the clamping force around the shaft is caused mainly by axial displacement of the machine member along the clamping sleeve.

Depending on which type of attachment is chosen, e.g. in connection with a ball bearing, different types of inner race rings must be available for the bearing. For mounting directly upon the shaft, which might be cylindrical or tapering, inner race rings having a cylindrical bore or a tapering bore, respectively, shall be used. At mounting with sleeve are used inner race rings having tapering portions corresponding to those of the clamping sleeve. Furthermore, the bearing must be increased by one size. Manufacture and stockkeeping of several different standard types of the same element, i.e. in this case bearing inner race rings, of course implies a big cost.

SUMMARY OF THE INVENTION

The purpose of the present invention is to provide a more flexible system for mounting a machine member on a shaft, which substantially reduces the required number of standard types of the same element and, therefore, implies a cost saving both regarding manufacture and stockkeeping. This has been solved in accordance with the invention therein that said opening firstly has surface portions of a shape corresponding to the shape of the shaft, cylindrical or tapering, and, secondly, has surface portions having a shape corresponding to the shape of the clamping surfaces of the clamping sleeve for allowing optional attachment of the machine member directly on the shaft or by means of the clamping sleeve.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
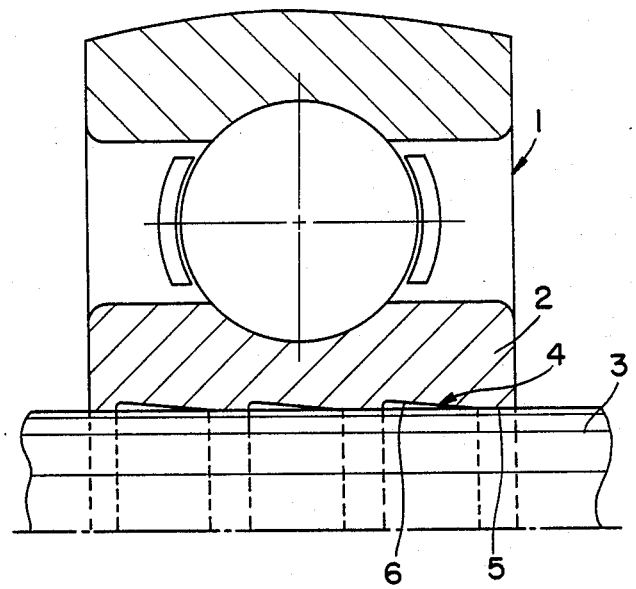
FIGS. 1-3 are axial sections through different embodiments of the invention.

A machine member, here shown as an inner race ring 2 of a ball bearing 1, is attached to a shaft 3. The inner race ring 2 has a bore 4 provided firstly with cylindrical portions 5 and, secondly, with tapering portions 6. The bearing shown in FIG. 1 is attached directly upon the cylindrical shaft 3 by means of a shrinkage fit, a press fit or a glue joint, thus that the cylindrical portions 5 of the bore 4 cooperate with the shaft 3. For tapering shafts 3 the portions 5, of course, shall have a taper corresponding to that of the shaft 3.

Figure 2:
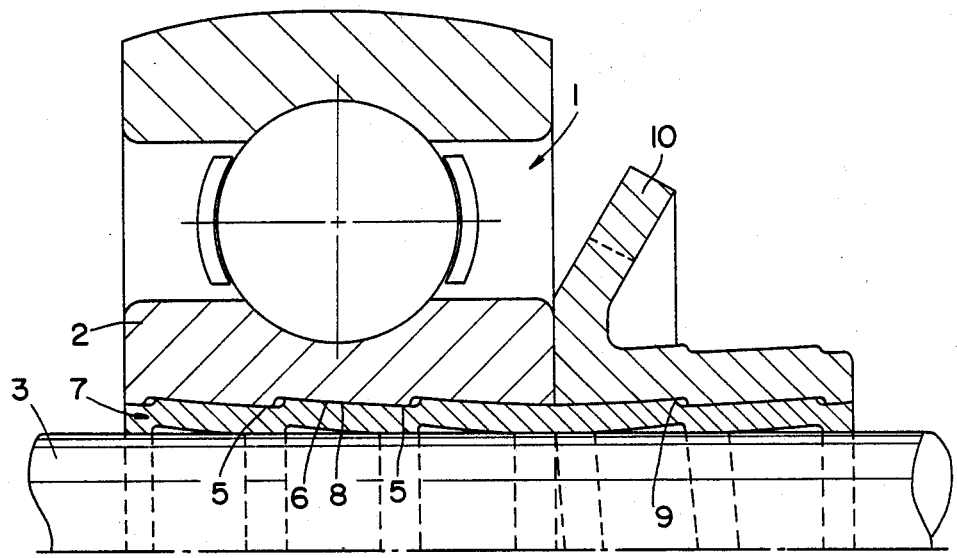

In the embodiment shown in FIG. 2, the inner race ring 2 of the bearing 1 is mounted on the shaft 3 via a clamping sleeve 7 having tapering grooves 8 and threads 9. The tapering grooves 8 cooperate with tapering portions 6 of the inner race ring 2, whereas a nut 10 is tightened around the threads 9 of the sleeve 7. The inner race ring 2, furthermore, has cylindrical bore portions 5, which in this case, however, are inactive. Grooves 8 as well as threads 9 form a small angle to the axis of the sleeve, preferably a smaller angle than the fiction angle in each contact, i.e. for an angle $\alpha$ shall $\tan \alpha < \mu$ where $\mu$ is the friction coefficient in each contact. The friction coefficient in a contact steel to steel is about 0.15, whereby the angles are preferably smaller than about 10°. The friction surfaces thereby are irreversible.

Figure 3:
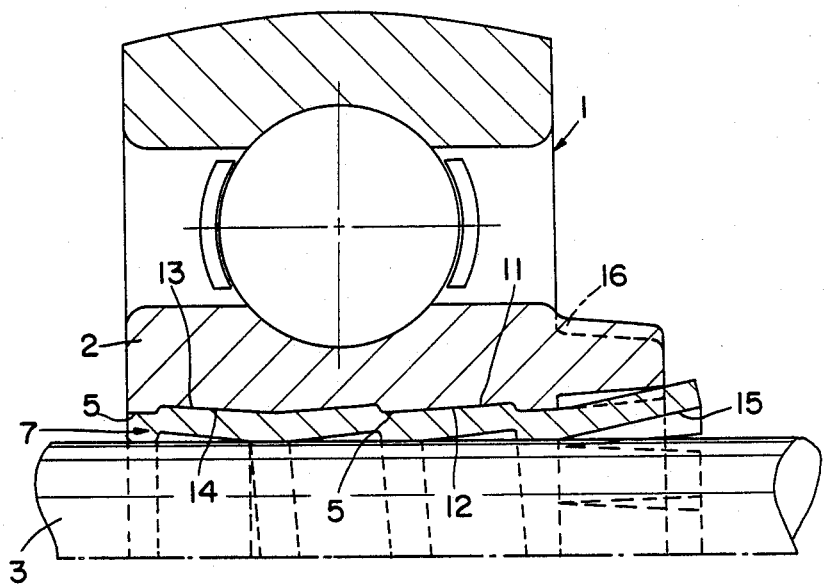

The inner race ring 2 shown in FIG. 3 has cylindrical portions 5 and tapering thread flanks 11 cooperating with corresponding thread flanks 12 in the clamping sleeve 7, which thread flanks form a small angle to the axis of the sleeve 7. The inner race ring 2 is provided with a key grip 16 and tightening of the joint is effected by the inner race ring being turned in relation to the sleeve 7. When turned, the two opposed tapering surfaces 13, 14 in the inner race ring 2 and in the sleeve 7, respectively, press against each other, whereby a counterstay is established thus that the turning results in the thread flanks 11, 12 being pressed radially against each other and the sleeve 7 is deformed to seizing position around the shaft 3. The sleeve 7 is slotted 15 at the end situated in front of the key grip 16 in order to lock the inner race ring 2 against the sleeve 7 by turning, when so required. The surface portions 6, 11 and 13 define a serrated shape corresponding to the shape of the clamping surfaces 8, 12 and 14.

The advantages gained by combining in one inner race ring a cylindric and tapering bore are, beside lower manufacturing and storekeeping costs, that it at shaft mounting, i.e. mounting directly upon the shaft, is possible to use a shaft of bigger diameter for the same bearing. The inner race ring, furthermore, will get a lower susceptibility to creeping, due to a higher concentration of the surface pressure in the pressing joint. At mounting with sleeve it is in a corresponding manner not necessary to increase the size of the bearing as compared to mounting directly on the shaft.

The size of the cylindrical surfaces 5 is adapted to appropriate surface pressures against the shaft 3 and which corresponds to the material in question, e.g. steel or plastic material. The positioning of the cylindrical or tapering surfaces 5 and 6 respectively, can be adapted to the resultant load in the bearing type. Such a possible positioning is symmetrical to the radial center line, see FIG. 1.

The invention is, of course, not limited to the embodiments shown but a plurality of modifications are possible within the scope of the accompanying claims.

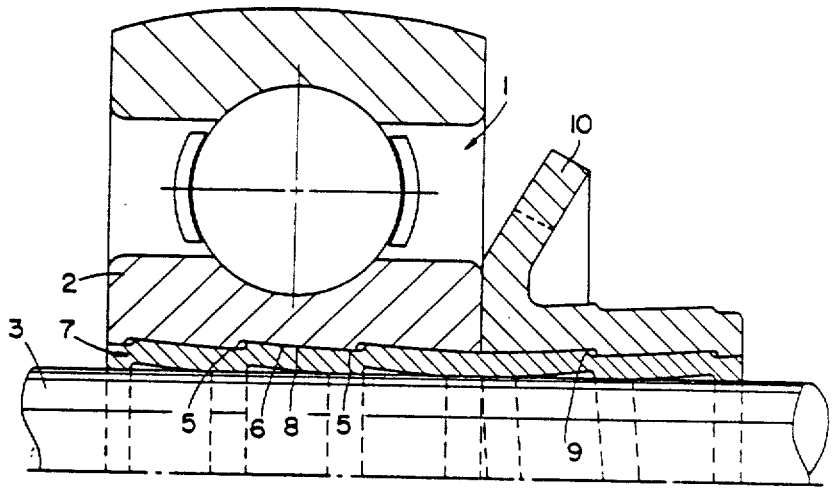

What is claimed is:

1. A device for attachment of a machine member (2) to a shaft (3), whereby the machine member has an opening (4) for said shaft, characterized therein, that said opening (4) firstly has surface portions (5) of a shape corresponding to the shape of the shaft (3), cylindrical or tapering, and, secondly, has surface portions (6, 11, 13) having a serrated shape corresponding to the shape of the clamping surfaces (8, 12, 14) of a clamping sleeve (7), for allowing optional attachment of the machine member (2) directly on the shaft (3) or by means of the clamping sleeve (7).

2. A device as claimed in claim 1, characterized therein, that the surface portions corresponding to the clamping sleeve (7) are tapering portions (6, 13) and/or thread flanks (11), which form a small angle to the longitudinal direction of the clamping sleeve (7).

* * * * *

UNITED STATES PATENT AND TRADEMARK OFFICE
CERTIFICATE OF CORRECTION

PATENT NO. : 4,909,643

DATED : March 20, 1990

INVENTOR(S) : Rune Adolfsson

It is certified that error appears in the above-identified patent and that said Letters Patent is hereby corrected as shown below:

The title page showing the illustrative figure should be deleted to appear as per attached title page.

Signed and Sealed this

Fifth Day of May, 1992

Attest:

DOUGLAS B. COMER

*Attesting Officer*  Acting Commissioner of Patents and Trademarks

United States Patent [19]

Adolfsson

[11] Patent Number: 4,909,643
[45] Date of Patent: Mar. 20, 1990

[54] DEVICE FOR ATTACHMENT OF A MACHINE MEMBER TO A SHAFT

[75] Inventor: Rune Adolfsson, Borås, Sweden

[73] Assignee: SKF Nova AB, Goteborg, Sweden

[21] Appl. No.: 286,478

[22] Filed: Dec. 19, 1988

[30] Foreign Application Priority Data

Jan. 11, 1988 [SE] Sweden .............................. 8800043

[51] Int. Cl.⁴ .............................................. F16C 19/06
[52] U.S. Cl. ................................. 384/538; 384/540; 384/585
[58] Field of Search ............... 384/537, 540, 538, 585, 384/584, 428

[56] References Cited

U.S. PATENT DOCUMENTS

| | | | |
|---|---|---|---|
| 929,851 | 8/1909 | Hess | 384/540 X |
| 3,806,215 | 4/1974 | Price et al. | 384/538 X |
| 3,807,820 | 4/1974 | Schuhmann | 384/538 |
| 3,957,385 | 5/1976 | Ullberg | 384/540 X |
| 4,343,565 | 8/1982 | Hallerback | 384/538 |
| 4,545,691 | 10/1985 | Kastan et al. | 384/538 X |
| 4,552,468 | 11/1985 | Hopper, Jr. | 384/540 X |

Primary Examiner—Lenard A. Footland
Attorney, Agent, or Firm—Eugene E. Renz

[57] ABSTRACT

A device for attachment of a machine member to a shaft, whereby the machine member has an opening for said shaft. The opening has on one hand surface portions of a shape corresponding to the shape of the shaft, cylindrical or tapering, and on the other hand, surface portions having a shape corresponding to the shape of the clamping surfaces of a clamping sleeve, for allowing optional attachment of the machine member directly on the shaft or by means of the clamping sleeve.

2 Claims, 2 Drawing Sheets